United States Patent [19]

Harant

[11] 4,307,515
[45] Dec. 29, 1981

[54] MEASURING VEHICLE FRONT END PARAMETERS

[75] Inventor: Gerhart W. Harant, Melbourne, Australia

[73] Assignee: Repco Limited, Melbourne, Australia

[21] Appl. No.: 94,466

[22] Filed: Nov. 15, 1979

[30] Foreign Application Priority Data

Nov. 16, 1978 [AU] Australia .............................. PD6801
Sep. 10, 1979 [AU] Australia .............................. PE0396

[51] Int. Cl.³ .............................................. G01B 5/255
[52] U.S. Cl. .................................................. 33/203.13
[58] Field of Search ........... 33/203.13, 203.12, 203.14, 33/203

[56] References Cited

U.S. PATENT DOCUMENTS

| 3,208,154 | 9/1965 | Pancoast | 33/203.13 |
| 3,453,740 | 7/1969 | Sakamoto | 33/203.13 |
| 3,871,106 | 3/1975 | Hegenbart | 33/203.13 |

FOREIGN PATENT DOCUMENTS 1235123 5/1960 France ............................ 33/203.13

Primary Examiner—William D. Martin, Jr.
Attorney, Agent, or Firm—Schwartz, Jeffery, Schwaab, Mack, Blumenthal & Koch

[57] ABSTRACT

The invention relates to a method and apparatus for dynamically measuring vehicle front end parameters such as toe-in (or toe-out) and camber angle. The apparatus includes a separate pair of support rollers for supporting each vehicle front wheel and causing rotation thereof. A sensing roller is adapted to contact the tire tread surface at the lowermost point of the tire so as to be rotated by rotation of the wheel. The axis of the sensing roller is arranged transverse to the plane of rotation of the wheel such that any toe-in or toe-out of the wheel causes a transverse or generally axial displacement of the sensing roller to a position wherein the axis of the sensing roller is normal to the toe-in or toe-out direction of the wheel. The sensing roller is mounted on an axle which forms one bar of a trapezium shaped four bar linkage which causes said sensing roller to pivot about an effective pivot point which is arranged, by means of said linkage, a considerable distance away from the wheel. The pivot point is the point of intersection of the center lines of the tapered sides of the linkage since the bars of the linkage are pivotally interconnected. A further sensing roller for measuring camber angle and methods of measuring toe-in and camber angle are also disclosed and claimed.

7 Claims, 5 Drawing Figures

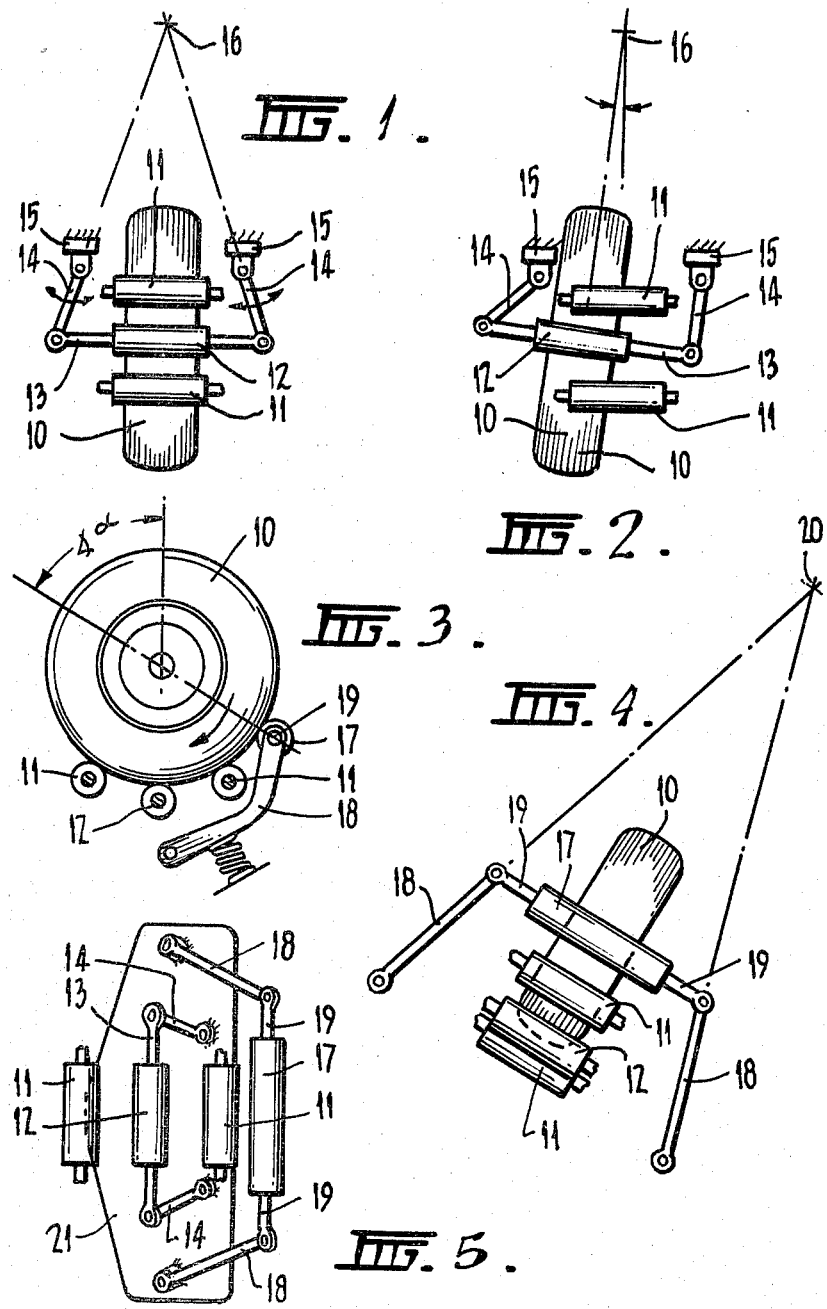

MEASURING VEHICLE FRONT END PARAMETERS

This invention relates to the measurement of vehicle front end parameters and in particular to a method and apparatus for dynamically measuring the parameter of front wheel track alignment (toe-in or toe-out). The invention may be extended to also measure camber and caster angle of vehicle front wheels.

Of the prior art shown to applicant, U.S. Pat. Nos. 3,208,154 (Pancoast), 3,453,740 (Sakamoto) and 3,871,106 (Hegenbart) are the most relevant. Whilst all three of these patents relate to dynamic wheel alignment measuring apparatus they each have their own particular shortcomings and all suffer the common disadvantage of being complex and hence costly to produce.

The U.S. patent to Pancoast uses a pair of spaced support rollers under each vehicle front wheel to support the weight of the vehicle and cause rotation of the wheel in contact therewith. Unlike some of the earlier patents' Pancoast does not use sideways (lateral) displacement of the rollers to measure toe-in but instead mounts the rollers on a base 17 which is adapted to rotate about a vertical axis 27 and uses the rotational movement of the base 17 as a measure of toe-in. A major defect is inherent in the Pancoast apparatus. Since neither roller is immediately below the wheel axle, that is, at the lowermost point of the tire camber of the wheel will adversely influence toe-in measurements. Thus the Pancoast apparatus proposes complex servo controlled apparatus to tilt the base 17 and consequently the rollers, according to any camber angle of the wheel. There are other less significant shortcomings of the Pancoast apparatus which will be apparent to persons skilled in the art.

The U.S. patent to Sakamoto avoids the aforementioned defect of the Pancoast apparatus by the provision of a separate measuring roller located between two support rollers which support the vehicle weight and cause rotation of the vehicle under test. Rotation of the wheel causes axial movement of the measuring or checking roller 16 due to any toe-in or toe-out of the wheel and such movement is detected by a sensor unit which controls a servo means to cause pivotal movement of the axis of the roller 16 about a pivot point at the end of the roller so as to bring the roller into alignment with the axis of rotation of the vehicle wheel. This apparatus is totally reliant on the servo means for its operation and is therefore unduly complex.

The U.S. patent to Hegenbart postulates a further theoretical improvement of the class of apparatus considered here. According to Hegenbart a pair of sensing rollers is used to perform an operation very similar in effect to the solution proposed by Pancoast. The sensing rollers are separate from the support rollers as in Sakamoto. As with Sakamoto the Hegenbart apparatus requires a complex servo mechanism or some equivalent system to achieve line-up of the sensing rollers with the wheel axis of rotation. This is because the sensing roller support system pivots are tied to a common pivot point and one sensing roller is leading the pivot point in the direction of wheel rotation and the other is trailing. Only the trailing roller will align itself without servo assistance; a leading roller tends to run off line. Thus the Hegenbart apparatus is also unduly complex and costly.

Thus it is evident that the prior art arrangements suffer from a number of defects or disadvantages which no doubt explains why few have been commercially realized.

Accordingly it is a main object of the present invention to provide an improved method and apparatus which avoids or overcomes one or more of the defects or disadvantages of the aforementioned prior art.

In order that the invention may be more readily understood reference should be made to the accompanying drawings which show various embodiments in greater detail.

In the drawings:

FIG. 1 is a schematic underside view of a vehicle front wheel arranged on apparatus according to one embodiment of the invention, FIG. 2 is a view the same as FIG. 1 and shows the apparatus when measuring toe-in of the wheel, FIG. 3 is a schematic side elevation of a vehicle wheel showing a camber measuring roller which may be added to the apparatus of FIGS. 1 and 2.

FIG. 4 is a third angle projection of FIG. 3 and

FIG. 5 is a schematic plan view of the apparatus shown in FIGS. 3 and 4 with the vehicle wheel omitted.

Referring now to FIG. 1 there is shown an underside view of a vehicle wheel 10 which is supported on spaced support rollers 11 such that the wheel 10 may be rotated thereby. The rollers 11 are arranged transverse to the straight ahead position of the vehicle (not shown) and are in a fixed orientation. At least one of the rollers 11 is driven by means of a suitable drive motor (not shown) whereby the wheel 10 may be rotated by virtue of frictional contact between the tire tread surface of the wheel 10 and the driven roller 11. A further sensing or measuring roller 12 is arranged between the support rollers 11 and is adapted to contact the tire tread surface. The measuring roller 12 does not support the vehicle weight but is biased against the tire tread surface by means not shown. The measuring roller 12 is arranged by the lowermost point of the tire tread surface, that is, vertically below the wheel axle. The roller 12 is arranged on an axle 13 which forms part of a linkage arrangement as will be described below and the mounting of the roller 12 on the axle 13 is such that any transverse (axial) movement of the roller 12 is transmitted to the axle 13 to cause a similar movement of the axle.

The aforementioned linkage arrangement is comprised of the axle 13 and side members 14 which in combination with a fixed frame 15 provide a trapezium shaped four bar linkage arrangement. It should be noted that the side members 14 are pivotally connected to the frame 15 and to the ends of the axle 13. The purpose of the linkage arrangement is to enable pivotal movement of the measuring roller 12 about an effective pivot point 16 due to forces applied to the roller 12 in an axial direction due to any misalignment between the forward direction of the wheel 10 and the pivot point 16. In other words if the wheel 10 is arranged to have toe-in or toe-out as shown in FIG. 2 rotation of the wheel by means of one or both support rollers 11 will cause the measuring roller 12 in contact with the tire tread surface to assume the position shown. In the position shown in FIG. 2 the measuring roller 12 has assumed a position normal to the forward direction of the wheel 10. It is incorrect to say that the axis or axle of the roller 12 has assumed a position normal to the plane of the wheel 10 since any camber angle of the wheel 10 will have no affect on the position of the roller 12 since it is at the lowermost point of the tire tread surface and is thus not influenced by camber angle. Thus the axle 13 is only normal to the plane of the wheel 10 if zero camber angle exists.

It should be appreciated that the purpose of the linkage arrangement is to place the effective pivot point 16 a relatively great distance in front of the wheel 10. The purpose of this is two fold. Firstly, if sideways displacement of the measuring roller 12 is taken as a measurement of the toe-in or toe-out of the wheel 10, it is desirable to achieve relatively large movements of the roller 12 for relatively small angles. In order to achieve this result it is desirable that the effective pivot point 16 be arranged a considerable distance in front of the wheel 10, say in the order of meters. Secondly, it has to be realized that the transverse or axial force available to align the measuring roller 12 is given by the frictional force on the roller 12 as it is rotated by the tire. A frictional drag force is caused by contact of tire and roller and acts along the central plane of the wheel 10. The frictional drag force is proportional to the frictional force causing alignment. Should there be any misalignment between the frictional drag force and the pivot point 16 this drag force will cause a moment about the pivot point 16 introducing errors into any readings obtained. This will not only depend on tire characteristics but will depend on the amount of misalignment and the effective pivot distance. Thus the further the effective pivot point 16 is arranged from the wheel 10 the less effect the drag moment will have on the readings obtained. Since in practice it is virtually impossible to avoid some misalignment in this regard it is desirable to place the pivot point a considerable distance in front of the wheel. This realization has resulted in an apparatus according to a preferred form of the present invention which is far more accurate in measuring vehicle toe-in or toe-out than any other simple apparatus previously contemplated. Whilst in a crude form of the present invention the measuring roller 12 could be mounted on a plate or arm which is connected to a pivot point a considerable distance in front of the wheel, this would be most inconvenient in practice as it would render the apparatus very cumbersome. Thus the trapezium shaped linkage arrangement is a preferred form of the apparatus since it enables an effective pivot point to be arranged a considerable distance in front of the wheel 10 without a physical connection to the pivot point. It should be realized that the side members 14 could be arranged to extend rearwardly from the axle 13 to a fixed frame 15 behind the wheel while still maintaining the effective pivot point 16 in front of the wheel. In order to achieve this the axle 13 would be made as the shorter of the parallel members of the trapezium shaped linkage arrangement such that the center-lines of the side members 14 would still interesect at a point 16 in front of the wheel. It is generally considered that in order to achieve the desired accuracy using apparatus according to this invention the effective pivot point 16 should be arranged at a distance away from the measuring roller 12 which is an order of magnitude greater than the maximum misalignment which is likely to occur between the pivot point 16 and the plane of the wheel 10 in the true straight ahead position of the wheel 10. In this way any misalignment will have a negligible effect on the accuracy of the apparatus.

Referring now to FIGS. 3 and 4 there is shown a schematic side elevation and a true third angle projection, respectively, of the apparatus shown in FIGS. 1 and 2 with the addition of a further sensing or measuring roller 17. For convenience the linkage arrangement supporting the roller 12 has been omitted in FIGS. 3 and 4. The further sensing or measuring roller 17 is a camber angle measuring roller which is arranged against the tire circumference in a similar manner to the roller 12 but in a position forward and above the roller 12. By locating the roller 17 below the horizontal central plane of the wheel clearance underneath a mudguard of the vehicle is facilitated. The roller 17 will be displaced axially due to the camber angle of the wheel 10 when it is rotated due to rotation of the wheel 10 in the direction of the arrow shown. The roller 17 is mounted on a trapezium shaped linkage arrangement similar to the linkage arrangement previously described for mounting the roller 12. The linkage arrangement for the roller 17 comprises side members 18 and an axle 19. The fourth member of the linkage arrangement comprises a fixed frame as will be described later with respect to FIG. 5. It should be noted that in this case the roller 17 is mounted on the shorter of the two parallel bars of the trapezium shaped linkage arrangement. This enables the side members 18 to extend downwardly from the roller 17 to a position below the wheel 10 where they do not interfere with the vehicle body and the center-lines of the side members 18 intersect at an effective pivot point 20 which is well forward and above the wheel 10. In other words the roller 17 is effectively a trailing roller similar to the trailing roller 12 when considered in relation to its effective pivot point and the direction of rotation of the wheel. Thus both the rollers 12 and 17 will move, due to tire rotation, to a neutral position wherein the roller 12 is normal to the toe-in direction of the wheel and roller 17 is in a position related to the camber angle and toe-in of the wheel 10. With regard to the roller 17 it is necessary to know the angle alpha in order to compute th camber angle of the wheel as toe-in has an effect but this does not create any difficulty. Thus, contrary to the prior art, both the rollers of the present invention will assume a neutral position rather than continuing to run off the tire tread surface. It should be appreciated that in a converse situation the measuring roller 17 may be arranged in a similar position rearward and upward of the roller 12 although it would be necessary to arrange the axle 19 as the longer of the parallel members of the four bar linkage arrangement such that the roller is again a trailing roller with respect to the direction of wheel rotation. In this latter case the linkage arrangement could be mounted from a point identical to the point shown in FIG. 3.

As an alternative to computing camber angle by knowledge of the angle alpha it should be realized that the road wheels could be turned to align the road wheel under test such that the toe-in roller 12 indicates zero toe-in for the purpose of measuring camber angle. This is because the camber measuring roller 17 is not on the horizontal central plane through the wheel 10 and as a consequence is influenced in its transverse movement by any toe-in of the wheel 10.

FIG. 5 shows a plan view of the apparatus according to FIGS. 3 and 4 with the wheel removed. The apparatus is shown to be mounted on a platform 21 which forms one of the parallel bars of each of the four bar trapezium shaped linkage arrangements. In other words the platform 21 forms the shorter parallel bar of the linkage arrangement for roller 12 and the longer parallel bar of the linkage arrangement for roller 17. The platform 21 is arranged below the wheel and mounts the rollers 12 and 17 without interference to the support rollers 11. The apparatus of FIG. 5 is duplicated, that is, separate apparatus is provided for each front vehicle wheel. Preferably the apparatus of FIG. 5 is arranged so as to be movable in its entirety in a direction transverse of the vehicle longitudinal axis such that the effective pivot 16 may be aligned to be approximately on the plane of the wheel 10 when the wheels are in the straight ahead position. This movement may be achieved in any number of ways which are known per se and it should be appreciated that in the preferred form of the invention it is not necessary to accurately align the pivot 16 as the apparatus is designed to be accurate despite any small misalignment.

It is desirable when using the apparatus according to this invention to rotate only one front vehicle wheel at a time to take measurements and make adjustments. Using this method, it is preferable to lock the steering wheel in the straight ahead position as is usual in many alignment situations, and to measure and adjust the road wheel nearest the steering wheel to a figure of one half the total toe-in (or toe-out) whilst the other wheel is stationary on the rollers. Once this adjustment is complete the same operation is carried out on the opposite side road wheel with the already adjusted wheel stationary. This method of operation avoids any transverse movement of the vehicle with respect to the support rolls 11 and thus avoids the need for centralizing means to prevent this movement from occurring.

In order to obtain measurements from the apparatus described suitable graduated scales (not shown) could be provided to enable reading of the angle through which the sensing rollers 12 and 17 are turned. Alternatively a dial gauge or other similar device could be used. In a more sophisticated form a transducer (not shown) which converts movement of the sensing rollers into an electrical signal indicative of the amount of movement is provided and such electrical signal could be provided to a microprocessor for computation and readout of the actual toe-in, toe-out or camber readings. In cases where a microprocessor is used it is possible to measure camber angle without setting the wheel to the zero toe-in position since knowledge of the position of roller 17, that is, the angle alpha facilitates provision of a suitable look-up table in the processor to allow computation of camber even though toe-in has an effect on the position of the roller 17.

It should be evident from the description herein that the present invention provides a method and apparatus having improvements over the prior art both in simplicity of the apparatus and practicality of use. The sensing rollers are placed in positions, in use, which are readily accessible. In fact the apparatus of the invention is adapted to be arranged at the end of a vehicle production line where vehicles can be driven onto the apparatus and, after use, driven off in the forward direction. The spring biasing and location of the sensing rollers contributes to this facility.

It should also be evident that the invention does not suffer from the erroneous assumption of the prior art devices that the sensing rollers must align completely with the wheel axis, that is, at right angles to the wheel plane. The invention is based on the realization that this is by no means necessary. As long as the toe-in measuring roller is applied to the lowermost part of the vehicle tire it will give an accurate indication without having to be tilted to camber angle, and a similar argument would hold for a camber measuring roller in the position described in U.S. Pat. No. 3,871,106 (Hegenbart) provided of course the rollers are "trailing" rollers. Consequently it is possible to construct a toe-in measuring gauge without providing a camber roller. In an apparatus with a separate sensing roller between two support rollers as here contemplated there is no difficulty in ensuring that the sensing roller contacts the wheel very close to the lowermost point, and that this contact is so light that there is negligible tire distortion; hence the influence of camber on the reading is also negligible. Nor is it necessary to provide servo means for aligning the sensing roller or rollers. The invention is based on the realization that the axis of a pivoted sensing roller will accurately line up with the vehicle wheel axis as projected onto a plane tangential to the tire surface and through the sensing roller as long as the pivot point is in line with the frictional drag force or lies a considerable distance ahead of the roller/wheel contact point when viewed in the direction of wheel rotation. The invention provides such leading pivoting means (trailing roller) which are effectively independent of the size of the apparatus and of the direction of the measuring roller attachment.

I claim:

1. Apparatus for dynamically measuring vehicle wheel alignment parameters, said apparatus including support means for supporting a vehicle wheel and causing rotation thereof, and a sensing roller adapted for contact with the tire tread surface of a tire on said wheel to be rotated by said rotation of the wheel, said sensing roller being arranged at the lowermost point of said tire and on an axis of rotation extending transverse of the plane of rotation of said wheel whereby any toe-in or toe-out of said wheel causes, during rotation, a displacement of said sensing roller in said transverse direction to a position indicative of said toe-in or toe-out, and said sensing roller being mounted to pivot, according to said displacement, with respect to a pivot point located substantially co-planar with the plane of said wheel, in the true forward direction of said wheel and a substantial distance away from said roller, and in a position whereby said sensing roller trails said pivot point with respect to the direction of rotation of said wheel, means structurally related to the sensing roller to measure said displacement, for the purpose of computing toe-in or toe-out and said sensing roller being mounted for rotation on an axle forming one bar of a trapezium shaped four bar linkage constituting a pivoting system to facilitate said displacement, all the bars of said linkage being pivotally interconnected and said pivot point being defined by an imaginary point at which center-lines of the tapered members of said trapezium shaped linkage intersect.

2. Apparatus according to claim 1 wherein said substantial distance is about an order of magnitude greater than the maximum misalignment between said pivot point and said plane of said wheel in the true forward direction of said wheel.

3. Apparatus according to claim 2 wherein said pivot point is located in front of said wheel and said one bar is the longer of the parallel bars of said linkage, the shorter of said parallel bars comprising a mounting structure for supporting said linkage.

4. An apparatus according to claim 3 wherein a second sensing roller is provided and is adapted to contact said tire tread surface in a similar manner to said first mentioned roller, said second sensing roller being located away from said lowermost point whereby any camber of said wheel, during rotation, causes a transverse displacement of said second sensing roller, and said second sensing roller being mounted to pivot according to said displacement thereof, with respect to a pivot point located substantially co-planar with the plane of said wheel in said true forward direction of said wheel and in a position whereby said second sensing roller is in trailing relationship to its pivot point with respect to the direction of rotation of said wheel, said pivot point being a relatively substantial distance away from said roller, and means to measure said displacement of said second sensing roller for the purpose of computing camber angle of said wheel.

5. An apparatus according to claim 4 wherein said second sensing roller is arranged below the horizontal central plane of said wheel to facilitate insertion under a vehicle mudguard.

6. An apparatus according to claim 5 wherein said second sensing roller is arranged forward of said first mentioned roller and is arranged on an axle forming the shorter bar of a further trapezium shaped four bar linkage constituting a second pivoting system to facilitate said displacement of said second sensing roller, all the bars of said linkage being pivotally interconnected and said pivot point being defined by an imaginary point at which center-lines of the tapered members of said trapezium shaped linkage intersect whereby the physical mounting of said second sensing roller is below said wheel whereas said pivot point is above said wheel.

7. An apparatus according to claim 6 wherein said mounting structure constitutes the longer of the parallel bars of said further trapezium shaped linkage.

* * * * *